United States Patent
Yamamoto et al.

(10) Patent No.: US 11,454,516 B2
(45) Date of Patent: Sep. 27, 2022

(54) GYRO SENSOR CALIBRATION METHOD

(71) Applicant: AICHI STEEL CORPORATION, Tokai (JP)

(72) Inventors: Michiharu Yamamoto, Tokai (JP); Tomohiko Nagao, Tokai (JP); Hitoshi Aoyama, Tokai (JP)

(73) Assignee: AICHI STEEL CORPORATION, Tokai (JP)

( * ) Notice: Subject to any disclaimer, the term of this patent is extended or adjusted under 35 U.S.C. 154(b) by 82 days.

(21) Appl. No.: 17/059,228

(22) PCT Filed: May 17, 2019

(86) PCT No.: PCT/JP2019/019802
§ 371 (c)(1),
(2) Date: Nov. 26, 2020

(87) PCT Pub. No.: WO2019/235188
PCT Pub. Date: Dec. 12, 2019

(65) Prior Publication Data
US 2021/0215507 A1 Jul. 15, 2021

(30) Foreign Application Priority Data
Jun. 4, 2018 (JP) .............................. JP2018-106836

(51) Int. Cl.
*G01C 25/00* (2006.01)
*G01C 21/28* (2006.01)

(52) U.S. Cl.
CPC .......... *G01C 25/005* (2013.01); *G01C 21/28* (2013.01)

(58) Field of Classification Search
CPC ...... G01C 25/005; G01C 21/28; G01C 21/06; G01C 21/16; G05D 2201/0213; G05D 1/0261; G05D 1/027
See application file for complete search history.

(56) References Cited

U.S. PATENT DOCUMENTS

| | | | | |
|---|---|---|---|---|
| 4,852,677 A | * | 8/1989 | Okazaki | G05D 1/0272 180/169 |
| 2015/0247719 A1 | | 9/2015 | Huang et al. | |
| 2019/0212169 A1 | | 7/2019 | Yamamoto et al. | |

FOREIGN PATENT DOCUMENTS

| | | | | |
|---|---|---|---|---|
| CN | 106249736 A | * | 12/2016 | .......... G05D 1/0259 |
| JP | H02-247521 A | | 10/1990 | |

(Continued)

OTHER PUBLICATIONS

International Search Report for corresponding Application No. PCT/JP2019/019802, dated Aug. 20, 2019.

*Primary Examiner* — Natalie Huls
*Assistant Examiner* — Cynthia L Davis
(74) *Attorney, Agent, or Firm* — Renner, Otto, Boisselle & Sklar, LLP

(57) ABSTRACT

In a method of calibrating a gyro sensor mounted on a vehicle for measuring an angular velocity in a rotating direction generated about an axis of a vertical direction, a lateral shift amount detection process of detecting lateral shift amounts of the vehicle with respect to magnetic markers laid in a road, an azimuth estimation process of estimating, when the vehicle passes over a laying location where two magnetic markers are laid, an azimuth of the vehicle by a calculation process with the lateral shift amounts with respect to the two magnetic markers taken as input values, and a calibration process of calibrating the gyro sensor by using the azimuth of the vehicle estimated by the azimuth estimation process, are performed.

11 Claims, 14 Drawing Sheets

(56) References Cited

FOREIGN PATENT DOCUMENTS

| | | |
|---|---|---|
| JP | 2000-28632 A | 1/2000 |
| JP | 2014-215232 A | 11/2014 |
| JP | 2016-91412 A | 5/2016 |
| JP | 2018-036114 A | 3/2018 |
| JP | 2018-36797 A | 3/2018 |
| WO | 2017/209112 A1 | 12/2017 |

\* cited by examiner

[FIG. 1]
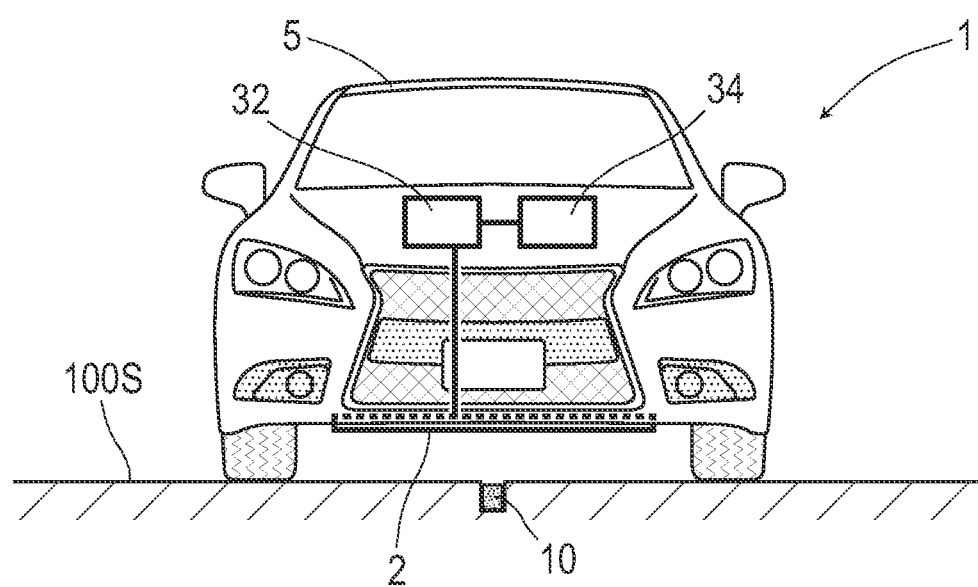

[FIG. 2]
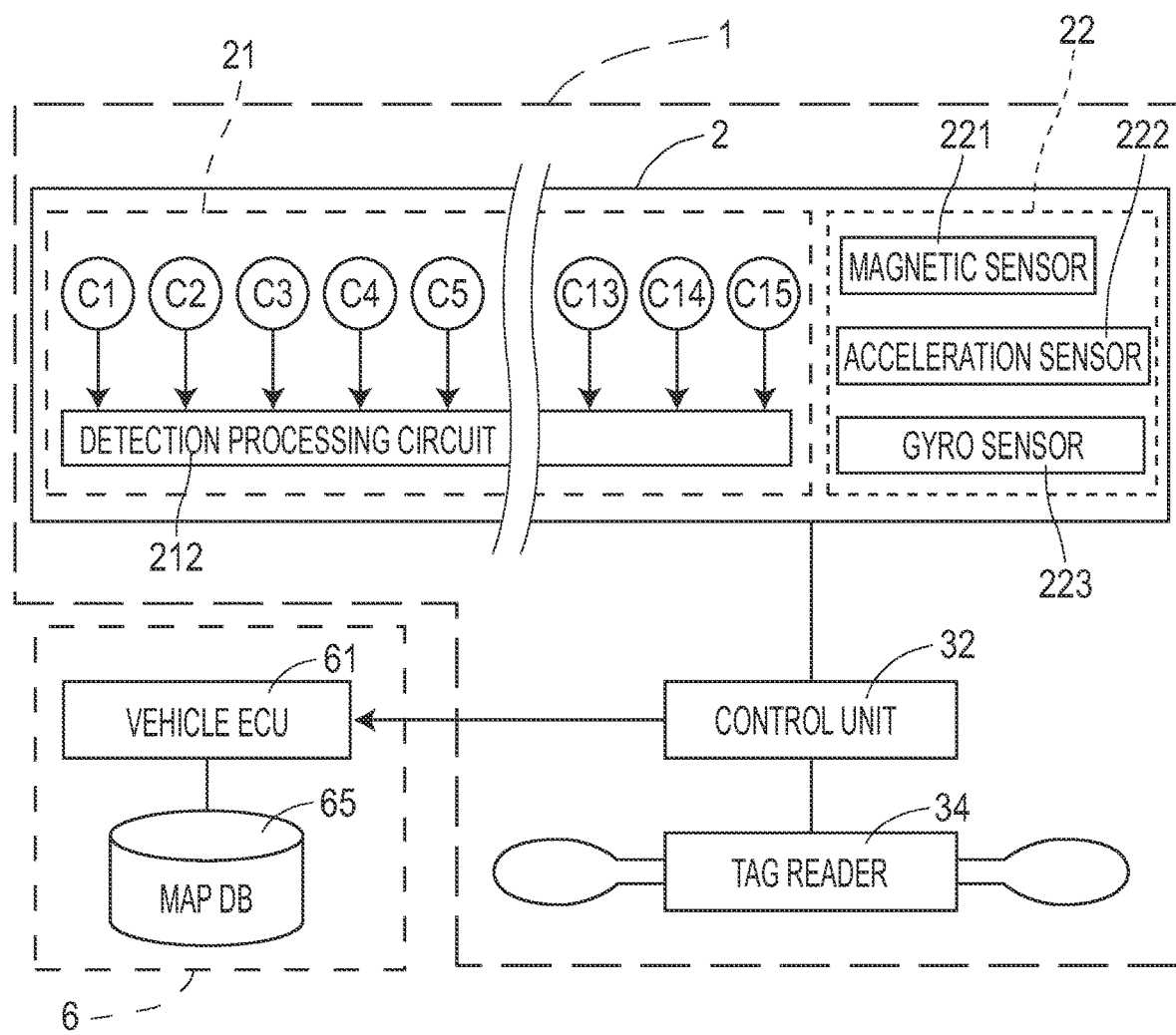

[FIG. 3]
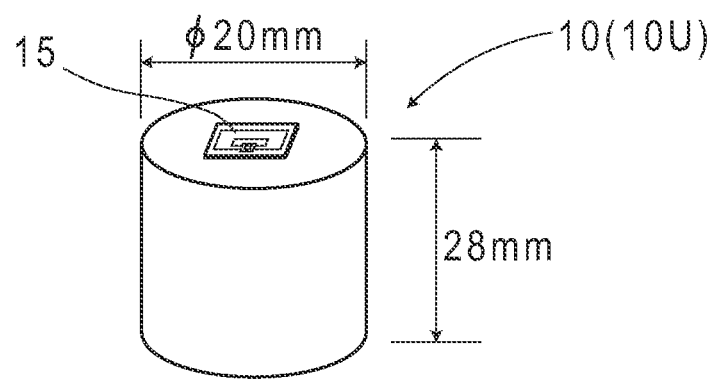

[FIG. 4]
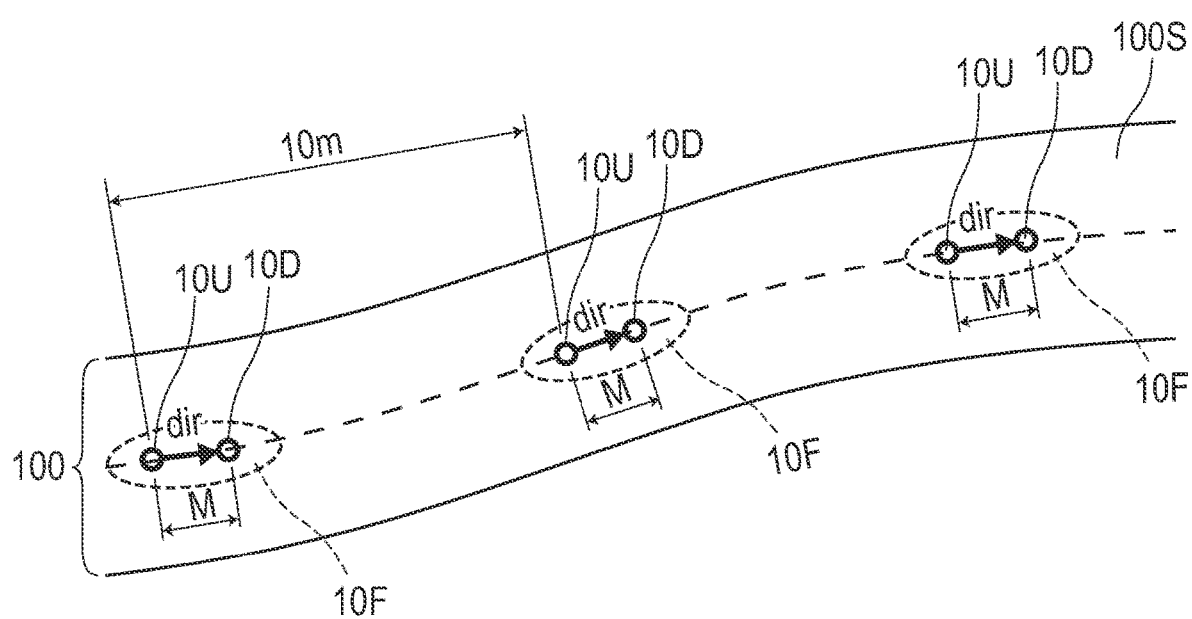

[FIG. 5]
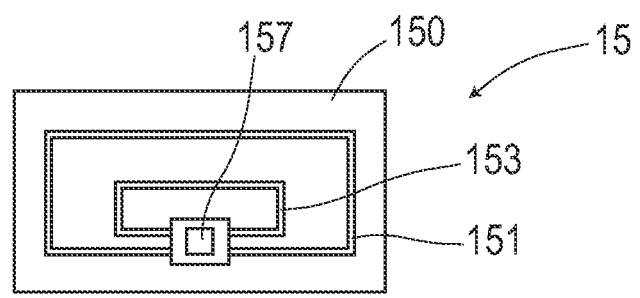

[FIG. 6]
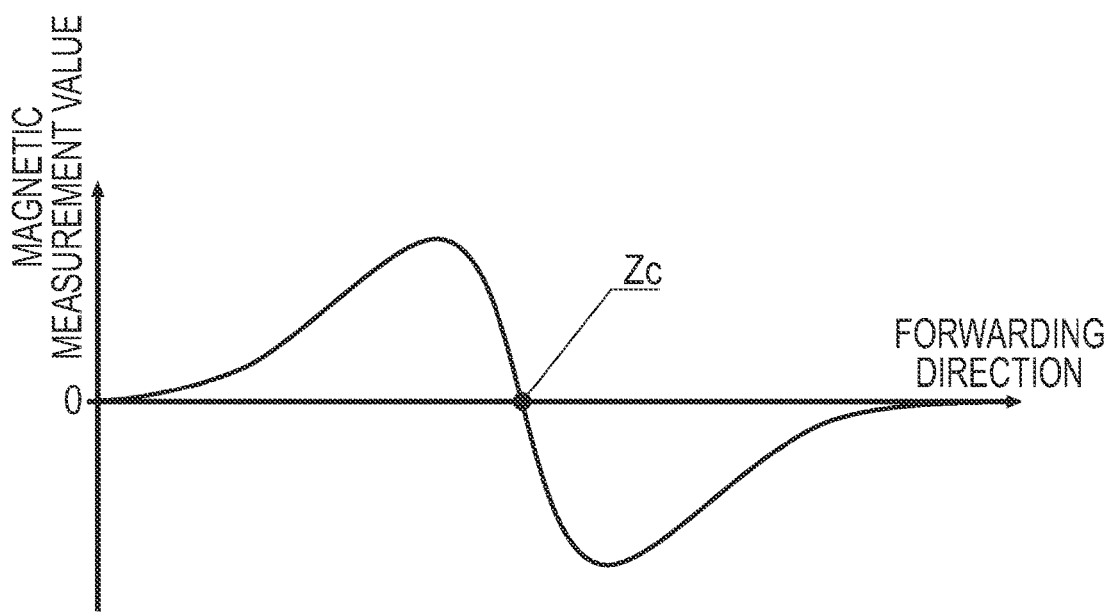

[FIG. 7]
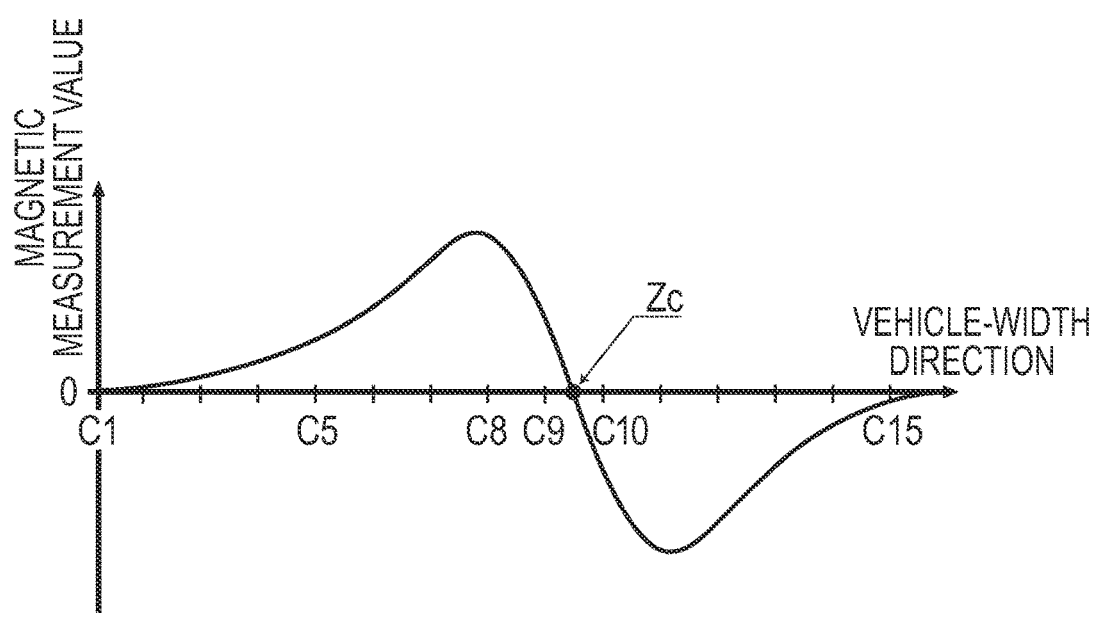

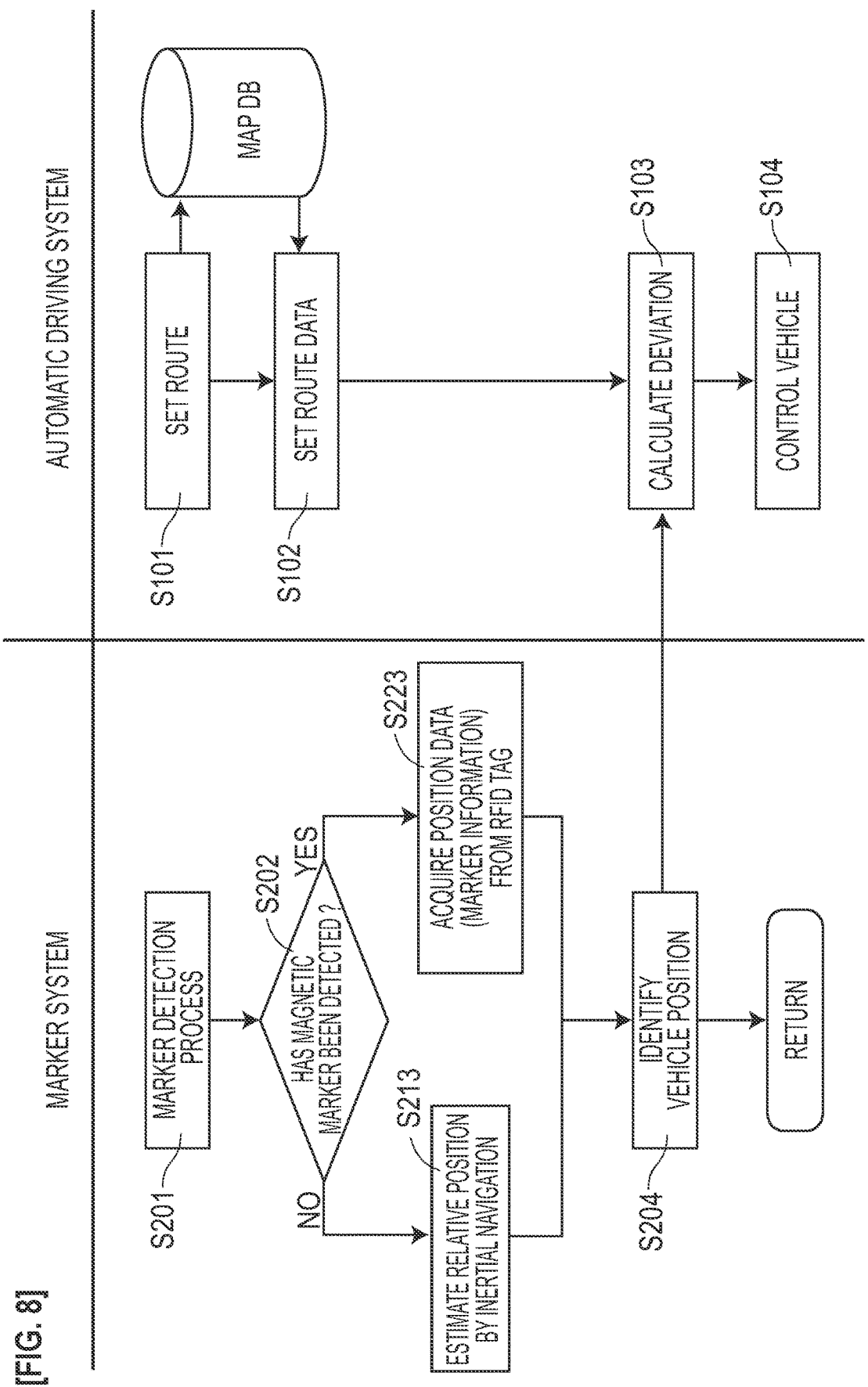

[FIG. 9]
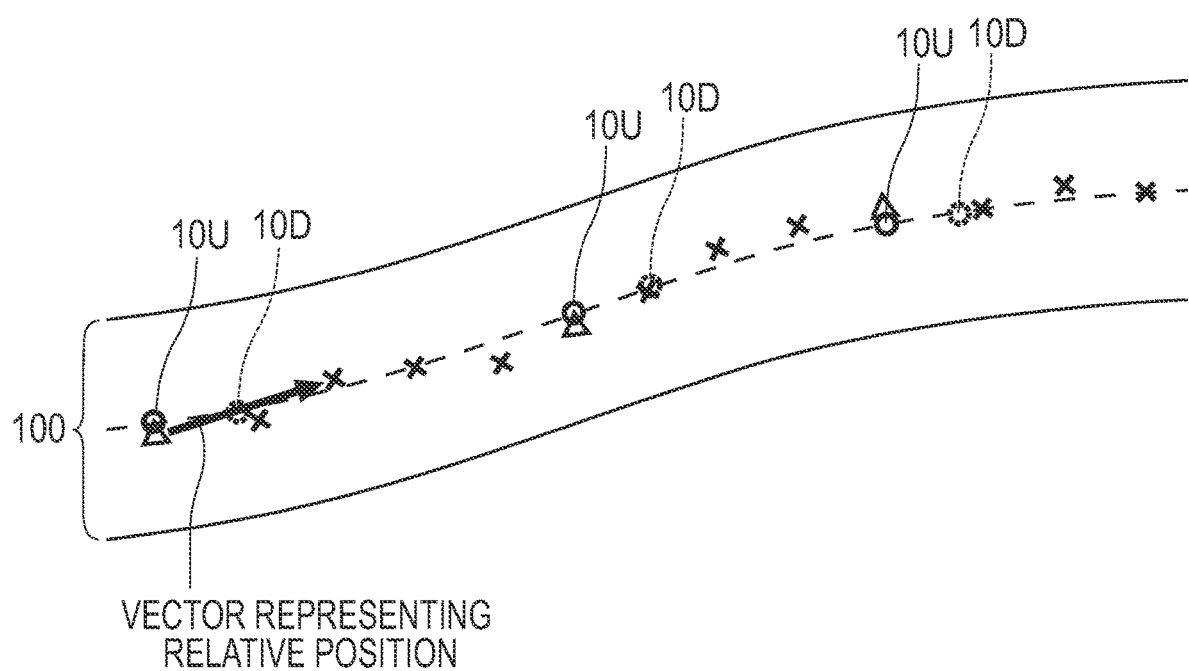

[FIG. 10]
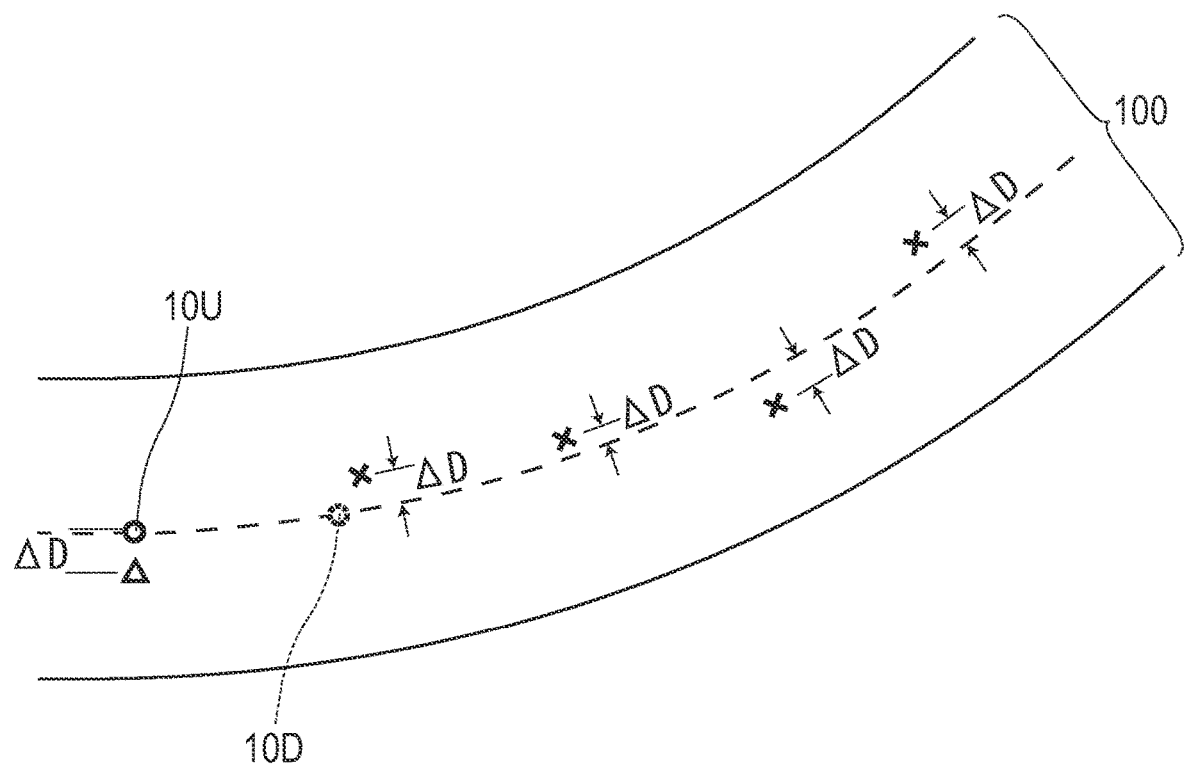

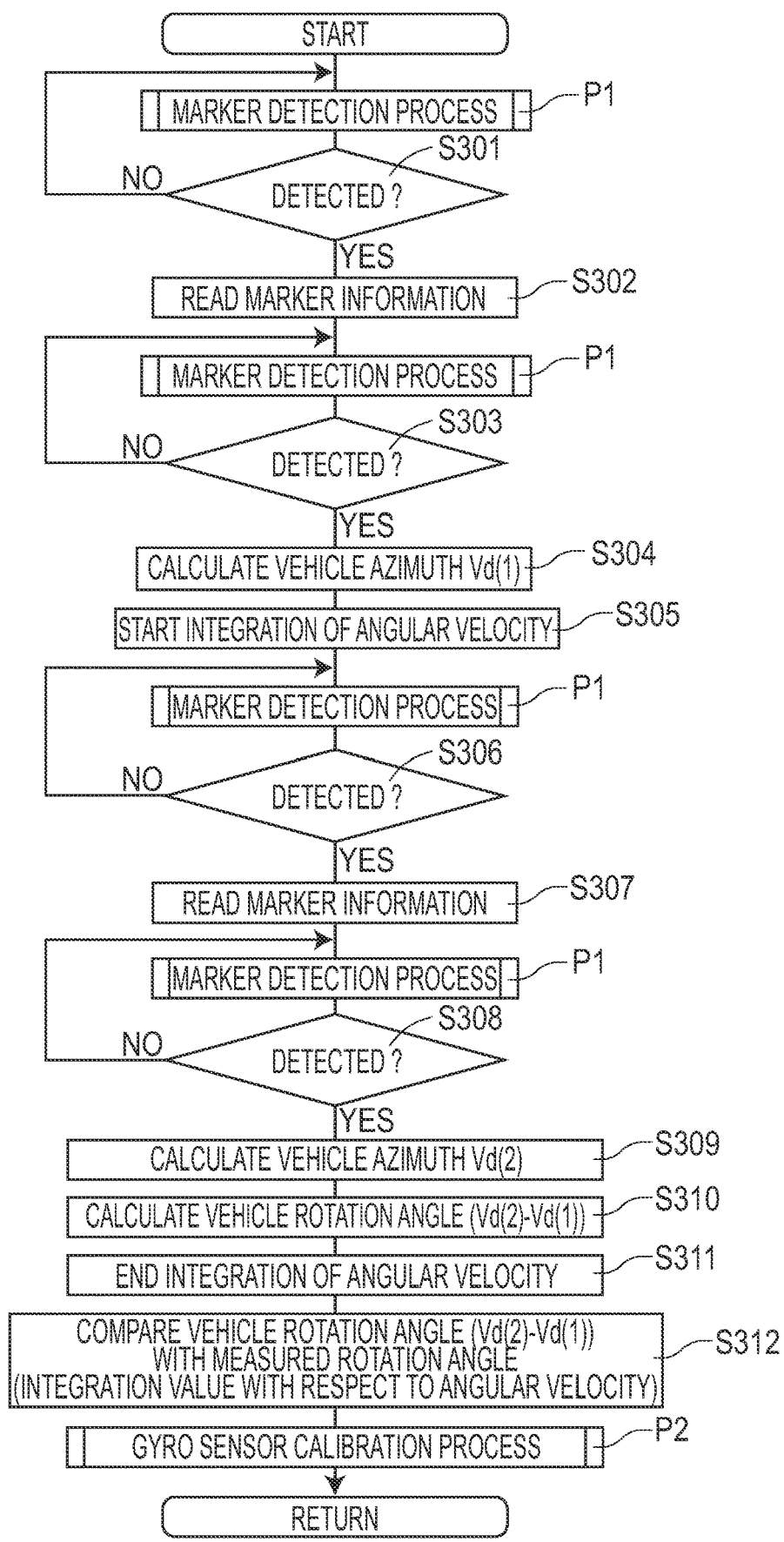
[FIG. 11]

[FIG. 12]
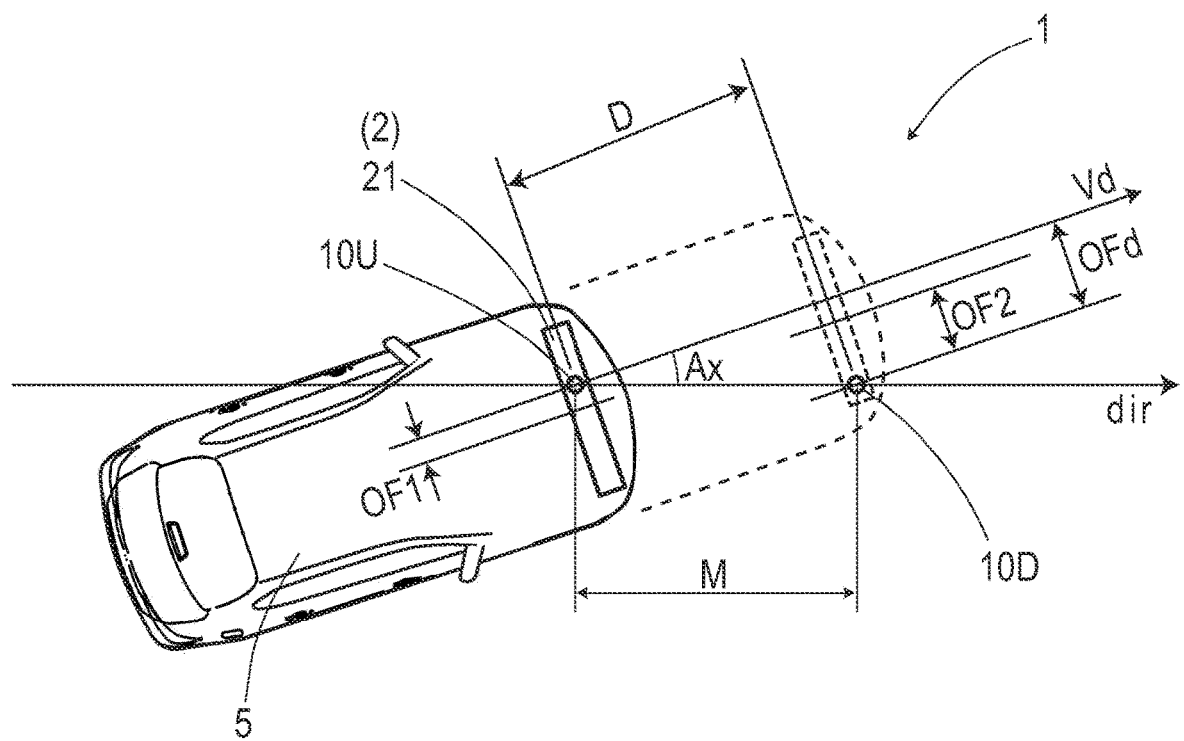

[FIG. 13]
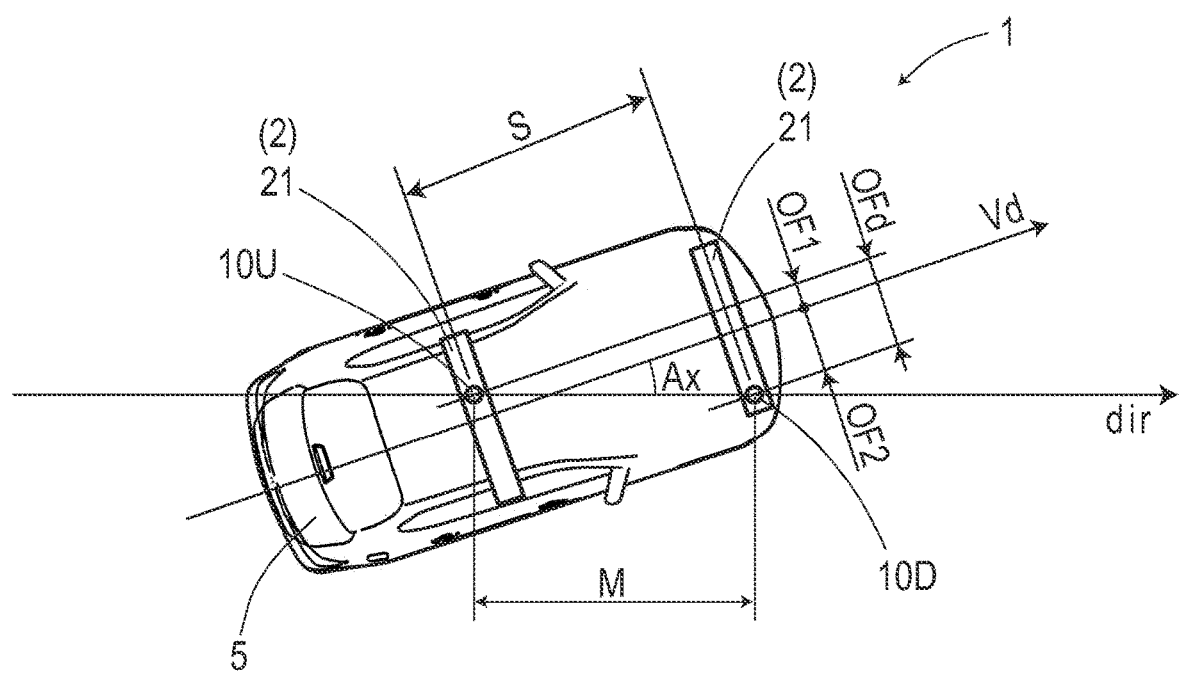

[FIG. 14]
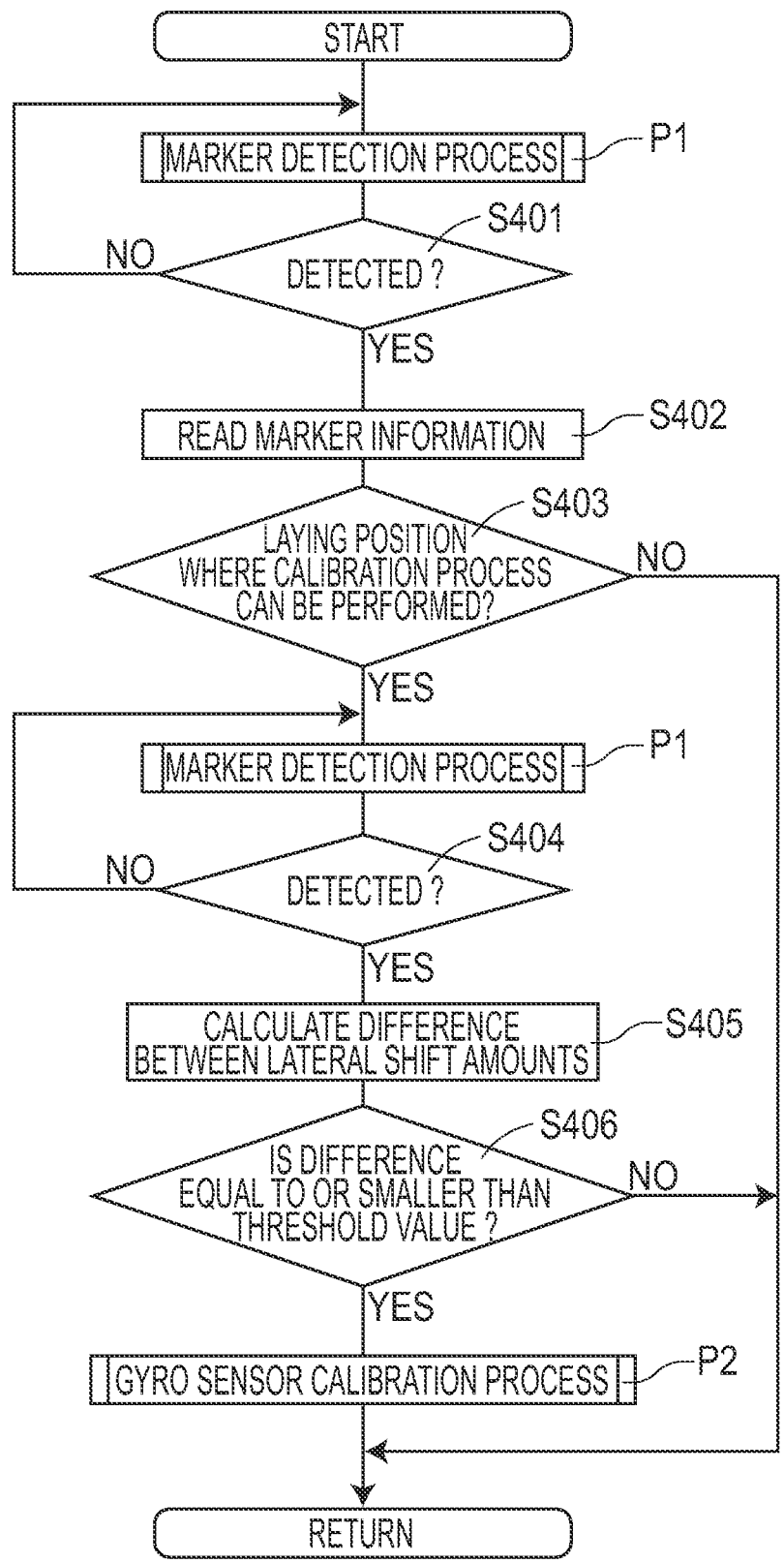

GYRO SENSOR CALIBRATION METHOD

TECHNICAL FIELD

The present invention relates to a method of calibrating a gyro sensor included in a vehicle.

BACKGROUND ART

In recent years, vehicles having navigation systems, vehicle control systems such as anti-skid control, or automatic driving systems incorporated therein have been increasing. In these systems, orientation (azimuths) of the vehicles, orientation changes of the vehicles, and so forth are required to be estimated with high accuracy. Thus, in many vehicles with these systems incorporated therein, a gyro sensor which measures an angular velocity in a rotating direction (yaw direction) of the vehicle about an axis of a vertical direction has been adopted (for example, refer to the following Patent Literature 1).

CITATION LIST

Patent Literature

Patent Literature 1: Japanese Unexamined Patent Application Publication No. 2016-91412

SUMMARY OF INVENTION

Technical Problem

For example, a zero point, which is a measurement value of the gyro sensor in a state in which a vehicle travels straight ahead, that is, in a state in which the angular velocity in the yaw direction is not generated, may fluctuate (drift) due to a passage of time or environmental conditions such as temperature fluctuations or vibrations. In this manner, output characteristics of the gyro sensor may fluctuate due to the passage of time or the environmental conditions, and there is a possibility that high measurement accuracy cannot be kept.

The present invention was made in view of the above-described conventional problem, and is to provide a gyro sensor calibration method for keeping high measurement accuracy of a gyro sensor.

Solution to Problem

The present invention resides in a gyro sensor calibration method in a vehicle including a gyro sensor which measures an angular velocity in a rotating direction generated about an axis of a vertical direction, the method including:

a lateral shift amount detection process of detecting lateral shift amounts of the vehicle with respect to magnetic markers laid in a road;

an azimuth estimation process of estimating, when the vehicle passes over a laying location where at least two of the magnetic markers are laid, an azimuth of the vehicle by a calculation process with the lateral shift amounts detected by the lateral shift amount detection process for the at least two of the magnetic markers taken as input values; and a calibration process of calibrating the gyro sensor by using the azimuth of the vehicle estimated by the azimuth estimation process.

Advantageous Effects of Invention

The gyro sensor calibration method of the present invention is a method of detecting the azimuth of the vehicle by using the magnetic markers laid in the road and using the magnetic markers for calibration of the gyro sensor. Unlike the gyro sensor, the azimuth of the vehicle detected by using the magnetic markers laid in the road is less possibly influenced by the passage of time, temperature changes, or the like. Therefore, if the azimuth of the vehicle detected by using the magnetic markers is used, the gyro sensor can be calibrated with high reliability.

BRIEF DESCRIPTION OF DRAWINGS

FIG. 1 is a front view of a vehicle to which a measurement unit is attached in a first embodiment.

FIG. 2 is a descriptive diagram depicting a configuration of a marker system in the first embodiment.

FIG. 3 is a descriptive diagram of a magnetic marker in the first embodiment.

FIG. 4 is a descriptive diagram depicting a laying mode of magnetic markers in the first embodiment.

FIG. 5 is a front view of an RFID tag in the first embodiment.

FIG. 6 is a descriptive diagram exemplarily depicting changes of a magnetic measurement value in a forwarding direction at the time of passing over the magnetic marker in the first embodiment.

FIG. 7 is a descriptive diagram exemplarily depicting a distribution of magnetic measurement values in a vehicle-width direction by magnetic sensors Cn arrayed in the vehicle-width direction in the first embodiment.

FIG. 8 is a flow diagram depicting a flow of vehicle's general operation in the first embodiment.

FIG. 9 is a descriptive diagram of a method of identifying a host vehicle position by the marker system in the first embodiment.

FIG. 10 is a descriptive diagram depicting deviation ΔD of the host vehicle position with respect to a traveling route in the first embodiment.

FIG. 11 is a flow diagram for describing a gyro sensor calibration method in the first embodiment.

FIG. 12 is a descriptive diagram of a method of detecting vehicle azimuth Vd in the first embodiment.

FIG. 13 is a descriptive diagram of the method of detecting vehicle azimuth Vd in a second embodiment.

FIG. 14 is a flow diagram for describing the gyro sensor calibration method in a third embodiment.

DESCRIPTION OF EMBODIMENTS

Modes for implementation of the present invention are specifically described by using the following embodiments.

First Embodiment

The present embodiment is an example in which marker system 1 which identifies a host vehicle position (vehicle position) with high accuracy is combined with automatic driving system 6. In particular, marker system 1 of the present embodiment has one of technical features in having a function of calibrating a gyro sensor by using magnetic markers 10. By utilizing this marker system 1, high accuracy of inertial navigation can be kept. Details of this are described by using FIG. 1 to FIG. 12.

Marker system 1 is configured to include, as in FIG. 1 and FIG. 2: measurement unit 2 which performs magnetic detection and so forth; tag reader 34, which is one example of a position information acquiring part which acquires marker information indicating a laying position of magnetic marker 10, and control unit 32 forming a positioning part which performs calculation for identifying the host vehicle position.

Automatic driving system 6 (FIG. 2) with which this marker system 1 is combined is configured to include vehicle ECU 61 which performs automatic driving control and map database (map DB) 65 which stores detailed three-dimensional map data (3D map data). Vehicle ECU 61 takes the host vehicle position identified by marker system 1 as a control input value, and controls a steering unit, an engine throttle, a brake, and so forth not depicted to cause vehicle 5 to automatically travel. Note that in FIG. 1, depiction of automatic driving system 6 is omitted.

In the following, after magnetic marker 10 to be laid in a road is generally described, details of measurement unit 2, tag reader 34 and control unit 32 are described.

Magnetic marker 10 is, as in FIG. 3 and FIG. 4, a road marker to be laid in road surface 100S of the road where vehicle 5 travels. Magnetic marker 10 has a columnar shape with a diameter of 20 millimeters (mm) and a height of 28 mm. Magnetic marker 10 is laid in a state of being accommodated in a hole provided in road surface 100S. A magnet forming magnetic marker 10 is a ferrite plastic magnet with magnetic powder of iron oxide as a magnetic material dispersed in a polymer material as a base material. This magnet has a characteristic of a maximum energy product (BHmax)=6.4 kilojoule per cubic meter (kJ/m$^3$).

Specifications of magnetic marker 10 of the present embodiment are partially depicted in Table 1, in which (mT) represents millitesla.

TABLE 1

| Type of magnet | Ferrite plastic magnet |
| --- | --- |
| Diameter | φ 20 mm |
| Height | 28 mm |
| Magnetic flux density Gs of the surface | 45 mT |

Magnetic marker 10 acts magnetism of a magnetic flux density of 8 µT (microtesla) at an upper-limit height of 250 mm in a range from 100 mm to 250 mm assumed as an attachment height of measurement unit 2. Also, in this magnetic marker 10, magnetic flux density Gs of the surface indicating magnetism on the surface is 45 mT.

In marker system 1, as in FIG. 4, laying locations 10F of magnetic markers 10 are provided along a center of lane 100 which is divided by left and right lane marks with, for example, ten-meter pitches. In each laying location 10F, two magnetic markers 10U and 10D are arranged with a two-meter pitch along a direction along the center of lane 100 (direction of the road). In the following, the two-meter pitch between two magnetic markers 10U and 10D is referred to as marker span M. Also, a direction of a line segment connecting two magnetic markers 10U and 10D is referred to as azimuth dir. Although description will be made in detail further below, in marker system 1, a vehicle azimuth (azimuth of the vehicle) can be identified with reference to this azimuth dir, and gyro sensor 223 can be calibrated.

Of two magnetic markers 10U and 10D arranged in each laying location 10F, magnetic marker 10U on an upstream side of the road, the upstream side corresponding to an opposite side to a forwarding direction, is used to identify the vehicle position. To this magnetic marker 10U on the upstream side, RFID (Radio Frequency IDentification) tag 15 as a wireless tag which wirelessly outputs information is annexed (refer to FIG. 3).

RFID tag 15 operates by wireless external power feeding and transmits marker information regarding magnetic marker 10U. The marker information includes position data indicating the laying position of corresponding magnetic marker 10U, azimuth data (one example of marker azimuth information capable of identifying azimuth dir) indicating azimuth dir (FIG. 4), and so forth. Note that of two magnetic markers 10 arranged in laying location 10F, magnetic marker 10D positioned on a downstream side is a magnetic marker defining azimuth dir, and does not have RFID tag 15 annexed thereto.

Here, as described above, the magnet of magnetic marker 10 has magnetic powder of iron oxide dispersed in the polymer material. This magnet has low conductivity, so that eddy current and so forth are less likely to occur at the time of wireless power feeding. Therefore, RFID tag 15 annexed to magnetic marker 10 can efficiently receive wirelessly-transmitted electric power.

RFID tag 15 forming one example of an information providing part is an electronic component having an IC chip 157 implemented on a surface of tag sheet 150 (FIG. 5) cut out from, for example, a PET (Polyethylene terephthalate) film. On the surface of tag sheet 150, a printed pattern of loop coil 151 and antenna 153 is provided. Loop coil 151 is a power-receiving coil in which exciting current occurs by external electromagnetic induction. Antenna 153 is a transmission antenna for wirelessly transmitting marker information. RFID tag 15 is arranged on a surface of a road surface 100S side of magnetic marker 10U.

Next, measurement unit 2, tag reader 34, and control unit 32 included in vehicle 5 are described.

Measurement unit 2 is a unit, as in FIG. 1 and FIG. 2, with sensor array 21 as a magnetic detection part and IMU (Inertial Measurement Unit) 22 as one example of a relative position estimating part integrated together. Measurement unit 2 forming a long stick shape is attached, for example, to the inside of a front bumper in a state of facing road surface 100S. In the case of vehicle 5 of the present embodiment, the attachment height of measurement unit 2 with reference to road surface 100S is 200 mm.

Sensor array 21 of measurement unit 2 includes fifteen magnetic sensors Cn (n is an integer from 1 to 15) arrayed on a straight line and detection processing circuit 212 having a CPU and so forth not depicted incorporated therein. Note that in this sensor array 21, fifteen magnetic sensors Cn are equidistantly arranged with 10-centimeter pitches. Measurement unit 2 is attached to vehicle 5 so that a direction of arraying magnetic sensors Cn in sensor array 21 matches a vehicle-width direction.

Magnetic sensors Cn are sensors which detect magnetism by using the known MI effect (Magneto Impedance Effect) in which an impedance of a magneto-sensitive body such as an amorphous wire sensitively changes in response to an external magnetic field. In each magnetic sensor Cn, magneto-sensitive bodies such as amorphous wires not depicted are arranged along two directions orthogonal to each other, thereby allowing detection of magnetism acting in the two directions orthogonal to each other. Note that in the present embodiment, magnetic sensors Cn are incorporated in sensor array 21 so as to be able to detect magnetic components in the forwarding direction and the vehicle-width direction.

Magnetic sensors Cn are highly-sensitive sensors with a measurement range of the magnetic flux density of ±0.6 mT and a magnetic flux resolution of 0.02 µT within the measurement range. In the present embodiment, to support high-speed travel of vehicle 5, each magnetic sensor Cn of measurement unit 2 performs magnetic measurement in a cycle of 3 kHz.

Specifications of magnetic sensors Cn are partially depicted in Table 2, in which (kHz) represents kilohertz.

TABLE 2

| Measurement range | ±0.6 mT |
|---|---|
| Magnetic flux resolution | 0.02 μT |
| Sampling frequency | 3 kHz |

As described above, magnetic marker 10 can act magnetism with the magnetic flux density equal to or larger than 8 μT in the range from 100 mm to 250 mm assumed as an attachment height of magnetic sensors Cn. Magnetic marker 10 acting magnetism with the magnetic flux density equal to or larger than 8 μT can perform detection with high reliability by using magnetic sensors Cn with the magnetic flux resolution of 0.02 μT.

Detection processing circuit 212 (FIG. 2) of sensor array 21 is an arithmetic circuit which performs a marker detection process for detecting magnetic marker 10, or the like. This detection processing circuit 212 is configured by using a CPU (central processing unit) which performs various calculations as well as memory elements such as ROM (read only memory), RAM (random access memory), and so forth.

Detection processing circuit 212 acquires a sensor signal outputted from each of magnetic sensors Cn in a period of 3 kHz, performs the marker detection process, and then inputs the detection result to control unit 32. Although description will be made in detail further below, in this marker detection process, in addition to detection of magnetic marker 10, a lateral shift amount detection process is performed for measuring a lateral shift amount of vehicle 5 with respect to detected magnetic marker 10.

IMU 22 (FIG. 2) incorporated in measurement unit 2 is an inertial navigation unit which estimates a relative position of vehicle 5 by inertial navigation. IMU 22 includes magnetic sensor 221 as an electronic compass which measures an azimuth, acceleration sensor 222 which measures acceleration, and gyro sensor 223 which measures angular velocity. Gyro sensor 223 is attached to vehicle 5 so as to measure the angular velocity in a rotating direction about an axis of a vertical direction. If the angular velocity measured by gyro sensor 223 is combined with the azimuth measured by magnetic sensor 221, the azimuth of vehicle 5 can be estimated with high accuracy.

IMU 22 calculates a displacement amount by double integration of the acceleration and totalizes displacement amounts along the azimuth of vehicle 5, thereby calculating the relative position with respect to a reference position. By using the relative position estimated by IMU 22, the host vehicle position can be estimated also when vehicle 5 is positioned in the middle of adjacent magnetic markers 10U.

Tag reader 34 is a communication unit which wirelessly communicates with RFID tag 15 arranged on the surface of magnetic marker 10U. Tag reader 34 wirelessly transmits electric power required for operation of RFID tag 15, and receives marker information transmitted from RFID tag 15. As the marker information, as described above, there are position data indicating the laying position (absolute position) of corresponding magnetic marker 10U, azimuth data indicating azimuth dir of the line segment connecting magnetic markers 10U and 10D in laying location 10F, and so forth.

Control unit 32 is a unit for controlling measurement unit 2 and tag reader 34 as well as identifying the host vehicle position as a position of vehicle 5 on a real-time basis. This control unit 32 inputs the host vehicle position to vehicle ECU 61 configuring automatic driving system 6 of vehicle 5.

Control unit 32 includes an electronic substrate (omitted in the drawings) having a CPU which performs various calculations as well as memory elements such as ROM, RAM and so forth, implemented thereon. The method of identifying the host vehicle position by control unit 32 varies from when vehicle 5 arrives at magnetic marker 10U having RFID tag 15 annexed thereto, to when vehicle 5 is positioned in the middle of adjacent magnetic markers 10U. Although description will be described in detail further below, in the former case, control unit 32 identifies the host vehicle position by using marker information received from RFID tag 15 annexed to magnetic marker 10U. On the other hand, in the latter case, the host vehicle position is identified based on the relative position of vehicle 5 estimated by inertial navigation.

Next, after a flow of (1) marker detection process by marker system 1 and (2) general operation of vehicle 5 including marker system 1 in the present embodiment are described, (3) method of calibrating gyro sensor 223 is described.

(1) Marker Detection Process

The marker detection process is a process to be performed by sensor array 21 of measurement unit 2. As described above, sensor array 21 performs the marker detection process by using magnetic sensors Cn in the cycle of 3 kHz.

As described above, magnetic sensor Cn is configured to measure magnetic components in the forwarding direction and the vehicle-width direction of vehicle 5. For example, when this magnetic sensor Cn moves in the forwarding direction to pass directly above magnetic marker 10, a magnetic measurement value in the forwarding direction has its sign reversed before and behind magnetic marker 10 as in FIG. 6 and changes so as to cross zero at a position directly above magnetic marker 10. Therefore, during travel of vehicle 5, when zero-cross Zc occurs in which the sign of magnetism in the forwarding direction detected by magnetic sensor Cn is reversed, it can be determined that measurement unit 2 is positioned directly above magnetic marker 10. Detection processing circuit 212 determines that magnetic marker 10 is detected when measurement unit 2 is positioned directly above magnetic marker 10 and zero-cross Zc of the magnetic measurement value in the forwarding direction occurs as described above.

Also, for example, as for a magnetic sensor with the same specification as that of magnetic sensors Cn, assume movement along a virtual line in the vehicle-width direction passing directly above magnetic marker 10. In this case, the magnetic measurement value in the vehicle-width direction has its sign reversed on both sides across magnetic marker 10 and changes so as to cross zero at the position directly above magnetic marker 10. In the case of measurement unit 2 having fifteen magnetic sensors Cn arrayed in the vehicle-width direction, the sign of magnetism in the vehicle-width direction to be detected by each magnetic sensor Cn varies depending on which side the magnetic sensor Cn is present with respect to magnetic marker 10 (FIG. 7).

FIG. 7 is a diagram depicting a distribution of magnetic measurement values of respective magnetic sensors Cn of measurement unit 2 in the vehicle-width direction. Based on the distribution of that drawing, an intermediate position between adjacent two magnetic sensors Cn across zero-cross Zc where the sign of magnetism in the vehicle-width direction is reversed or a position directly below magnetic sensor Cn where a detected magnetism in the vehicle-width direction is zero and the signs of magnetic sensors Cn on both outer sides of the magnetic sensor Cn are reversed is a position of magnetic marker 10 in the vehicle-width direction. Detection processing circuit 212 measures a deviation of the position of magnetic marker 10 in the vehicle-width direction with respect to the center position (position of magnetic sensor C8) of measurement unit 2 as the above-described lateral shift amount (lateral shift amount detection process). For example, in the case of FIG. 7, the position of zero-cross Zc is a position corresponding to C9.5 in a neighborhood of a midpoint between C9 and C10. As described above, since the pitch between magnetic sensors C9 and C10 is 10 centimeters, the lateral shift amount of magnetic marker 10 is (9.5−8)×10 centimeters with reference to C8 positioned at the center of measurement unit 2 in the vehicle-width direction.

(2) General Operation of Vehicle

Next, with reference to FIG. 8 to FIG. 10, general operation of vehicle 5 including marker system 1 and automatic driving system 6 is described.

When a traveling route is set in automatic driving system 6 (S101), vehicle ECU 61 of automatic driving system 6 reads corresponding data from map DB 65 storing 3D map data, and sets detailed route data as a control target in automatic driving (S102). The route data is data including at least a series of points represented by data of absolute positions, for example, as indicated by a broken line in FIG. 9.

On the other hand, under control mode in which vehicle 5 travels by automatic driving, control unit 32 of marker system 1 repeatedly performs the marker detection process by sensor array 21 (S201). If magnetic marker 10U positioned on the upstream side in any laying location 10F has been detected (S202: YES), control unit 32 controls tag reader 34 so as to receive marker information outputted from RFID tag 15 (S223). Then, by taking the laying position of magnetic marker 10U indicated by the position data included in the marker information as a reference, control unit 32 identifies a position offset by the lateral shift amount measured by measurement unit 2 in the marker detection process as the host vehicle position (exemplarily indicated by a triangular mark in FIG. 9) (S204).

Note that a determination as to whether magnetic marker 10 detected by sensor array 21 is magnetic marker 10U on the upstream side or magnetic marker 10D on the downstream side in the laying position is determined by, for example, a distance from the laying position of magnetic marker 10U with RFID tag 15 from which the previous position data (marker information) has been received.

On the other hand, when vehicle 5 is positioned at a midpoint between adjacent magnetic markers 10U and magnetic marker 10U cannot be detected (S202: NO), IMU 22 incorporated in measurement unit 2 takes, as a reference position, the host vehicle position (position with the triangular mark in FIG. 9) identified based on the laying position of magnetic marker 10U most recently detected, and estimates the relative position of vehicle 5 by inertial navigation. Specifically, as described above, IMU 22 calculates the displacement amount by double integration of measured acceleration. Then, IMU 22 totalizes the displacement amounts along the measured azimuths with the changes of the forwarding direction of vehicle 5 detected by gyro sensor 223, and thereby estimates the relative position of vehicle 5 with respect to the above-described reference position. Control unit 32 identifies, as exemplarily depicted in FIG. 9, a position with a cross mark moved from the reference position by this relative position as a host vehicle position. Note that in FIG. 9, one example of a vector representing this relative position is indicated by an arrow.

The host vehicle positions (positions with triangular marks and cross marks in FIG. 9) identified by marker system 1 are inputted to vehicle ECU 61 of automatic driving system 6. Vehicle ECU 61 calculates deviation ΔD of the host vehicle positions with respect to the route data (S103) as control target values indicated by a broken line in FIG. 10. Based on this deviation ΔD, vehicle ECU 61 performs vehicle control such as steering-wheel control and throttle control (S104) to achieve automatic traveling.

(3) Method of Calibrating Gyro Sensor

As described above, in marker system 1 of the present embodiment, two magnetic markers 10U and 10D are arranged with the marker span M=two meters in each of laying locations 10F of magnetic markers 10 (refer to FIG. 4). Azimuth dir of the line segment connecting two magnetic markers 10U and 10D matches the direction along the center of lane 100, that is, the direction of the road. RFID tag 15 annexed to magnetic marker 10U on the upstream side in laying location 10F outputs (wirelessly transmits) azimuth data (marker information) indicating this azimuth dir.

In marker system 1, in each laying location 10F, vehicle azimuth Vd, which is an orientation of vehicle 5, can be identified by taking azimuth dir as a reference. And, by using vehicle azimuths Vd in two laying locations (points) 10F, gyro sensor 223 can be calibrated. A flow of this calibration method is described with reference to a flow diagram of FIG. 11.

In a state in which vehicle 5 is traveling, by controlling sensor array 21, control unit 32 repeatedly performs marker detection process P1 including the lateral shift amount detection process (S301: NO). When vehicle 5 arrives at the first laying location 10F and magnetic marker 10U on the upstream side is detected (S301: YES), by controlling tag reader 34, control unit 32 performs reading of marker information stored in RFID tag 15 (S302).

Also, control unit 32 controls sensor array 21 and restarts marker detection process P1. Control unit 32 repeatedly performs marker detection process P1 until magnetic marker 10D on the downstream side is detected (S303: NO). Then, when magnetic marker 10D on the downstream side is detected (S303: YES), by using lateral shift amounts OF1 and OF2 (FIG. 12) measured for magnetic markers 10U and 10D, respectively, by marker detection process P1, control unit 32 calculates vehicle azimuth Vd (S304, azimuth estimation process). In the following, the vehicle azimuth calculated in the first laying location 10F is taken as Vd(1) and the vehicle azimuth calculated in the second laying location 10F is taken as Vd(2).

Specifically, as in FIG. 12, based on lateral shift amounts OF1 and OF2 with respect to two magnetic markers 10U and 10D, control unit 32 calculates shift angle Ax of vehicle azimuth (forwarding direction) Vd with respect to azimuth dir by the following equation. Here, azimuth dir is an absolute azimuth indicated by azimuth data included in the marker information. Vehicle azimuth Vd can be identified as an azimuth obtained by taking azimuth dir as a reference and shifting azimuth dir by shift angle Ax to a yaw direction (rotating direction about the axis of the vertical direction).

Change of the lateral shift amount OFd=|OF2−OF1|

| Shift angle | Ax = arcsin(OFd/M) |
| --- | --- |

Here, lateral shift amounts OF1 and OF2 are defined so as to have a positive or negative value by taking the center of vehicle 5 in a width direction as a boundary.

Also, in response to the detection of magnetic sensor 10D on the downstream side in the first laying location 10F, control unit 32 starts a temporal integration process on angular velocities which are measurement values of gyro sensor 223 (S305, integration process). Note that this integration process is a calculation process for obtaining a measured rotation angle, which is a rotation angle in the yaw direction while the vehicle passes over two laying locations 10F. Control unit 32 continues this integration process until magnetic marker 10D on the downstream side in the second laying location 10F is detected.

After passing over the first laying location 10F, control unit 32 controls sensor array 21 and restarts marker detection process P1. This marker detection process P1 is repeatedly performed until magnetic marker 10 in the second laying location 10F is detected (S306: NO).

When magnetic marker 10U positioned on the upstream side in the second laying location 10F is detected (S306: YES), by controlling tag reader 34, control unit 32 performs reading of the marker information from RFID tag 15 (S307). Also, control unit 32 controls sensor array 21 to perform marker detection process P1 repeatedly so as to be able to detect magnetic marker 10D on the downstream side (S308: NO). Then, when magnetic marker 10D positioned on the downstream side in laying location 10F is detected (S308: YES), control unit 32 calculates vehicle azimuth Vd(2) based on lateral shift amounts OF1 and OF2 (FIG. 12) with respect to two magnetic markers 10U and 10D in a manner similar to the above (S309, azimuth estimation process).

Control unit 32 calculates a difference (change amount of vehicle azimuths) between vehicle azimuths Vd(1) and Vd(2) calculated and identified by vehicle 5 in any two laying locations 10F as a vehicle's rotation angle (S310, difference calculation process). Also, control unit 32 ends the temporal integration process on angular velocities measured by gyro sensor 223, and calculates the measured rotation angle (rotation angle) as this integration value (S311, integration process). Then, control unit 32 compares the vehicle rotation angle with the measured rotation angle (S312), and performs calibration process P2 on gyro sensor 223.

Here, details of calibration process P2 on gyro sensor 223 are described. If rotation in the yaw direction is zero (zero point), the angular velocity measured by gyro sensor 223 is ideally supposed to be zero (deg/second). However, in accordance with influences such as the passage of time, temperature changes, or the like, the zero point of gyro sensor 223 may be shifted, and it is often the case that the angular velocity outputted by gyro sensor 223 at the zero point is not zero. This shift amount at the zero point becomes evident as an integration constant when angular velocities are temporally integrated. Thus, the shift amount at the zero point may be identified by obtaining the integration constant with which the above-described difference between the vehicle rotation angle and the measured rotation angle becomes close to zero (the difference becomes small). When the shift amount at the zero point can be identified, the measurement values are preferably offset across the board so that the shift amount of the measurement value (angular velocity) outputted by gyro sensor 223 can be cancelled out. If gyro sensor 223 is calibrated in this manner, accuracy of the angular velocity outputted by gyro sensor 223 can be improved. For example, a value obtained by dividing the above-described difference between the vehicle rotation angle and the measured rotation angle by an interval of integration (number of times of integration) can also be handled as the shift amount at the zero point.

Furthermore, based on shift angle Ax in FIG. 12, a traveled distance D of vehicle 5 required for passing over two magnetic markers 10 with marker span M can be calculated, and vehicle speed can be calculated with high accuracy. Here, the timing when magnetic marker 10U on the upstream side is detected is taken as t1 and the timing when magnetic marker 10D on the downstream side is detected is taken as t2.

| Traveled distance | D = M × cosAx |
| --- | --- |
| Vehicle speed | V = D/(t2 − t1) |

If vehicle speed V calculated in response to passing over two magnetic markers 10 as described above is used, an error in speed (vehicle speed) obtained by integrating measured acceleration by IMU 22 can be identified. And, if the error in vehicle speed can be identified in this manner, calibration of acceleration sensor 222 measuring acceleration can be made.

As described above, marker system 1 of the present embodiment is a system which identifies the host vehicle position by using magnetic markers 10. In this marker system 1, reception of GPS waves and so forth is not premised. Thus, for example, position accuracy does not become unstable even in a location where GPS waves cannot be received or become unstable, such as in a tunnel or a place between buildings. By utilizing marker system 1, driving support control with high accuracy can be achieved irrespective of the environment.

In this marker system 1, it is required to keep high accuracy of IMU 22 achieving inertial navigation so as to be able to identify the vehicle position with high accuracy. In particular, as for sensors such as gyro sensor 223 and acceleration sensor 222, there is a possibility that measurement values may be shifted in accordance with the passage of time, temperature changes, or the like, and appropriate calibration whenever necessary is required.

In marker system 1 of the present embodiment, it is possible to calibrate gyro sensor 223, acceleration sensor 222, and so forth by using magnetic markers 10 laid in the road. If two magnetic markers 10U and 10D fixed to road surface 100S of the road and having their azimuth dir known are used, vehicle azimuth Vd in the yaw direction can be identified with high accuracy. Based on vehicle azimuth Vd identified with high accuracy, gyro sensor 223 measuring angular velocities in the yaw direction can be calibrated with high reliability.

Furthermore, if two magnetic markers 10U and 10D arranged with the pitch of marker span M of two meters in laying location 10F are used, vehicle speed V can be identified with high accuracy. If vehicle speed V with high accuracy is used, acceleration sensor 222 measuring acceleration as original data for calculating the vehicle speed by double integration can be calibrated.

Note that the calibration method of the present embodiment premises that changes of the steering angle are sufficiently small when the vehicle passes over laying location 10F. If the steering wheel is abruptly operated at the time of passing over laying location 10F to change the steering angle, calibration process P2 on gyro sensor 223 may be cancelled.

In present embodiment, the configuration example in which RFID tag 15 annexed to magnetic marker 10U transmits marker information including position data and azimuth data is described. In place of this, a marker database may be adopted which can be referred to by using a tag ID transmitted from RFID tag 15. In the marker database, position data indicating the laying position of at least one of two magnetic markers 10U and 10D in laying location 10F, azimuth data indicating absolute azimuth dir of the line segment connecting two magnetic markers 10U and 10D, and so forth are preferably recorded in association with the tag ID. If the marker database is referred to by using the tag ID, the laying position of corresponding magnetic marker 10 and absolute azimuth dir connecting two magnetic markers 10U and 10D in that laying position 10F can be obtained. The marker database may be provided in a server apparatus communicable with vehicle 5 or may be provided in a storage area of vehicle 5.

While the configuration example has been described in the present embodiment in which two magnetic markers 10 are arranged in each laying location 10F, three or more magnetic markers 10 may be linearly arranged.

In place of the configuration of the present embodiment in which two magnetic markers 10 are arranged along the direction of the road, a plurality of magnetic markers 10 may be arranged along a reference direction such as a south-north direction or an east-west direction. When the vehicle azimuth is identified as in FIG. 12, if azimuth dir connecting two magnetic markers 10 with respect to vehicle azimuth Vd forms an angle closer to a right angle, it becomes difficult to measure the lateral shift amount, and accuracy in calculation of vehicle azimuth Vd tends to decrease. Thus, three magnetic markers 10 may be arranged to form an L shape so that a arranging direction of magnetic markers 10 for use in calculating vehicle azimuth Vd can be selected. A vertical line and a lateral line in the L shape are preferably made to match the south-north direction and the east-west direction, respectively.

It may be configured in a manner such that, of the south-north direction and the east-west direction, magnetic markers 10 are arranged along the direction being more parallel to the direction of the road and a distinction between the directions can be identified by magnetic polarity. For example, as for magnetic polarities of two magnetic markers 10, N pole-N pole may represent the south-north direction and S pole-S pole may represent the east-west direction.

Second Embodiment

The present embodiment is an example of marker system 1 in which the method of identifying the vehicle azimuth Vd based on the first embodiment is changed. The present embodiment is different from the first embodiment in that sensor arrays 21 are arranged at the front and rear of vehicle 5 with a two-meter pitch. And, with this difference of the arrangement of sensor arrays 21, a method of identifying vehicle azimuth Vd is different from that of the first embodiment. These details are described with reference to FIG. 13. Note that FIG. 2 to FIG. 4 used for describing the first embodiment are also referred to as appropriate.

In marker system 1 of the present embodiment, as in FIG. 13, the arrangement pitch of sensor arrays 21 (sensor span S) in vehicle 5 and the arrangement pitch of magnetic markers 10 (marker span M) in laying location 10F match each other. Thus, when vehicle 5 passes over laying location 10F, front and rear sensor arrays 21 can detect two magnetic markers 10U and 10D almost simultaneously.

In the present embodiment, vehicle azimuth Vd is calculated based on lateral shift amounts OF1 and OF2 measured by front and rear sensor arrays 21 for magnetic markers 10U and 10D. Specifically, shift angle Ax of the vehicle azimuth (forwarding direction) with respect to azimuth dir of the line segment connecting two magnetic markers 10U and 10D can be calculated by the following equation. And, vehicle azimuth Vd can be identified as an azimuth obtained by taking azimuth dir as a reference and shifting azimuth dir by shift angle Ax to the yaw direction.

Change of the lateral shift amount OFd=|OF2−OF1|

| Shift angle | Ax = arcsin(OFd/M) |
|---|---|

When this method of identifying vehicle azimuth Vd is adopted, movement of vehicle 5 (passage of time) is not required. Thus, a possibility of occurrence of an error by steering-wheel operation is small.

Note that other configurations and operations and effects are similar to those of the first embodiment.

Third Embodiment

The present embodiment is an example in which details of the calibration process on gyro sensor 223 based on the configuration of the first embodiment are changed. These details are described with reference to FIG. 14. Note that FIG. 2 to FIG. 4 used for describing the first embodiment are also referred to as appropriate.

The calibration process on gyro sensor 223 in the present embodiment can be exclusively performed in laying location 10F provided on a flat linear road with, for example, a gradient change smaller than 0.01% and a radius of curvature equal to or larger than 3000 meters. The marker information transmitted from RFID tag 15 annexed to magnetic marker 10U on the upstream side arranged in this laying location 10F includes, in addition to position data and azimuth data similar to those in the first embodiment, information indicative of the above-described flat linear road and indicating that the calibration process of the present embodiment can be performed.

Here, a flow of the gyro sensor calibration process by marker system 1 of the present embodiment is described with reference to a flow diagram of FIG. 14.

In a state in which vehicle 5 is traveling, by controlling sensor array 21, control unit 32 included in vehicle 5 repeatedly performs marker detection process P1 (S401: NO). When magnetic marker 10U on the upstream side in laying location 10F is detected (S401: YES), by controlling tag reader 34, control unit 32 performs reading of marker information from RFID tag 15 (S402). Then, control unit 32 determines whether or not information indicating that the calibration process can be performed is included in the marker information (S403).

When information indicating that the calibration process can be performed is included in the marker information (S403: YES), control unit 32 controls sensor array 21 to restart marker detection process P1 so that adjacent magnetic marker 10D on the downstream side can be detected. When magnetic marker 10D is detected (S404: YES), control unit 32 calculates a differential value between lateral shift amounts with respect to magnetic markers 10U and 10D (S405).

When the differential value between the lateral shift amounts is equal to or smaller than a predetermined threshold value (such as, for example, 5 centimeters) (S406: YES), control unit 32 determines that the state is a straight-ahead state in which the shift angle (corresponding to Ax in FIG. 12) of the azimuth of vehicle 5 with respect to the direction of the linear road is sufficiently small. Then, when it is determined that vehicle 5 is in a linear state, calibration process P2 on gyro sensor 223 is performed. In this calibration process P2, gyro sensor 223 is calibrated so that the angular velocity, which is a measurement value of gyro sensor 223, becomes zero.

On the other hand, when information indicating that calibration can be performed is not included in the marker information outputted from RFID tag 15 (S403: NO), the differential value between the lateral shift amounts with respect to magnetic markers 10U and 10D exceeds the predetermined threshold value (S406: NO), or the like, calibration process P2 on gyro sensor 223 is cancelled.

In marker system 1 of the present embodiment, the example is such that information indicating that the calibration process can be performed is included in the marker information outputted from RFID tag 15. In place of or in addition to this, the number of arrangement of magnetic markers 10 in a laying location where the calibration process can be performed may be different, for example, three, from that in the other laying locations. In this case, gyro sensor 223 can also be calibrated in a laying location where magnetic marker 10 with RFID tag 15 is not laid.

Note that the above-described shift angle may be obtained by calculation using the equation of shift angle Ax described in the first embodiment. In this case, threshold determination regarding the shift angle is preferably performed.

Note that other configurations and operations and effects are similar to those of the first embodiment.

In the foregoing, specific examples of the present invention are described in detail as in the embodiments, these specific examples merely disclose examples of technology included in the scope of the claims. Needless to say, the scope of the claims should not be restrictively construed based on the configuration, numerical values, and so forth of the specific examples. The scope of the claims includes techniques acquired by variously modifying, changing, or combining the above-described specific examples as appropriate by using known techniques, knowledge of a person skilled in the art, and so forth.

REFERENCE SIGNS LIST

1 marker system
10 magnetic marker
15 RFID tag (information providing part, wireless tag)
2 measurement unit
21 sensor array (magnetic detection part)
212 detection processing circuit
22 IMU
222 acceleration sensor
223 gyro sensor
32 control unit
34 tag reader
5 vehicle
6 automatic driving system
61 vehicle ECU
65 map database (map DB)

The invention claimed is:

1. A gyro sensor calibration method in a vehicle including a gyro sensor which measures an angular velocity in a rotating direction generated about an axis of a vertical direction, the method comprising:
a lateral shift amount detection process of detecting lateral shift amounts of the vehicle with respect to magnetic markers laid in a road; an azimuth estimation process of estimating, when the vehicle passes over a laying location where at least two of the magnetic markers are laid,
an azimuth of the vehicle by a calculation process with the lateral shift amounts detected by the lateral shift amount detection process for the at least two of the magnetic markers taken as input values;
a calibration process of calibrating the gyro sensor by using the azimuth of the vehicle estimated by the azimuth estimation process; and
an integration process of temporally integrating measurement values of the gyro sensor while the vehicle passes over two of the laying locations, the two of the laying locations being separate and along the road, and wherein at least two of the magnetic markers are laid at each of the two of the laying locations, wherein
in the calibration process, the gyro sensor is calibrated so that a difference between a vehicle rotation angle, which is a difference in azimuths of the vehicle estimated by the azimuth estimation process at each of the two of the laying locations, and a measured rotation angle, which is an integrated value by the integration process, gets smaller than before performing the calibration process.

2. A gyro sensor calibration method in a vehicle including a gyro sensor which measures an angular velocity in a rotating direction generated about an axis of a vertical direction, the method comprising:
a lateral shift amount detection process of detecting lateral shift amounts of the vehicle with respect to magnetic markers laid in a road;
an azimuth estimation process of estimating, when the vehicle passes over a laying location where at least two of the magnetic markers are laid, an azimuth of the vehicle by a calculation process with the lateral shift amounts detected by the lateral shift amount detection process for the at least two of the magnetic markers taken as input values; and
a calibration process of calibrating the gyro sensor by using the azimuth of the vehicle estimated by the azimuth estimation process,
wherein the calibration process is a process in which, when the vehicle passes over the laying location, the laying location being provided on a linear road, when a differential value between said lateral shift amounts is equal to or smaller than a predetermined value, a value of the angular velocity measured by the gyro sensor is brought closer to zero.

3. The gyro sensor calibration method according to claim 1, wherein an information providing part is annexed to at least one of the magnetic markers arranged in the laying location, and the information providing part provides marker azimuth information identifying a direction of a line segment connecting the at least two of the magnetic markers arranged in the laying location.

4. The gyro sensor calibration method according to claim 3, wherein the information providing part is a wireless tag attached to the at least one of the magnetic markers.

5. The gyro sensor calibration method according to claim 1, wherein an information providing part is annexed to at least one of the magnetic markers arranged in the laying location, and the information providing part provides marker azimuth information identifying a direction of a line segment connecting the at least two of the magnetic markers arranged in the laying location.

6. The gyro sensor calibration method according to claim 5, wherein the information providing part is a wireless tag attached to the at least one of the magnetic markers.

7. The gyro sensor calibration method according to claim 2, wherein an information providing part is annexed to at least one of the magnetic markers arranged in the laying location, and the information providing part provides marker azimuth information identifying a direction of a line segment connecting the at least two of the magnetic markers arranged in the laying location.

8. The gyro sensor calibration method according to claim 7, wherein the information providing part is a wireless tag attached to the at least one of the magnetic markers.

9. The gyro sensor calibration method according to claim 1, wherein in the calibration process, the gyro sensor is calibrated so that the difference between the vehicle rotation angle and the measured rotation angle becomes zero.

10. The gyro sensor calibration method according to claim 3, wherein the marker azimuth information indicates the direction of the line segment connecting the at least two of the magnetic markers arranged in the laying location.

11. The gyro sensor calibration method according to claim 7, wherein the marker azimuth information indicates the direction of the line segment connecting the at least two of the magnetic markers arranged in the laying location.

* * * * *